United States Patent [19]

Lindsey et al.

[11] 4,160,540
[45] Jul. 10, 1979

[54] FAST ACTION DISCONNECT FOR USE ON A DOG NUT OF A POWER LINE INSULATOR AND THE LIKE

[75] Inventors: Keith E. Lindsey, Pasadena, Calif.; Hoyt W. Bozeman, Jr., Arlington, Tex.

[73] Assignee: Lindsey Manufacturing Company, Azusa, Calif.

[21] Appl. No.: 864,669

[22] Filed: Dec. 27, 1977

[51] Int. Cl.² .............................................. B66D 1/36
[52] U.S. Cl. ......................... 254/134.3 PA; 403/319; 403/381
[58] Field of Search ............... 254/134.3 R, 134.3 PA, 254/194–196; 174/40 R, 169; 403/319, 315, 316, 317, 318, 381

[56] References Cited

U.S. PATENT DOCUMENTS

| 852,533 | 5/1907 | Wicks | 254/196 |
| 1,794,998 | 3/1931 | Weinberger | 254/134.3 PA |
| 2,590,645 | 3/1952 | Petersen | 254/194 |
| 3,012,756 | 12/1961 | Cronkright | 254/134.3 PA |

FOREIGN PATENT DOCUMENTS

| 2445347 | 1/1976 | Fed. Rep. of Germany | 403/319 |
| 287753 | 3/1928 | United Kingdom | 403/319 |
| 1371264 | 10/1974 | United Kingdom | 403/317 |

Primary Examiner—Robert C. Watson
Attorney, Agent, or Firm—Sellers and Brace

[57] ABSTRACT

A fast action disconnect for releasably coupling parts together such as a power line stringing block and a conventional dog nut at the lower end of a power line insulator. The disconnect has a receiving socket for the dog nut insertable through one side of the disconnect and includes a barrier for releasably but positively locking the dog nut assembled to the disconnect. The barrier is movable between a retracted locking position and an extended release position permitting disassembly of a dog nut relative to the main body of the disconnect.

8 Claims, 5 Drawing Figures

U.S. Patent  Jul. 10, 1979  4,160,540
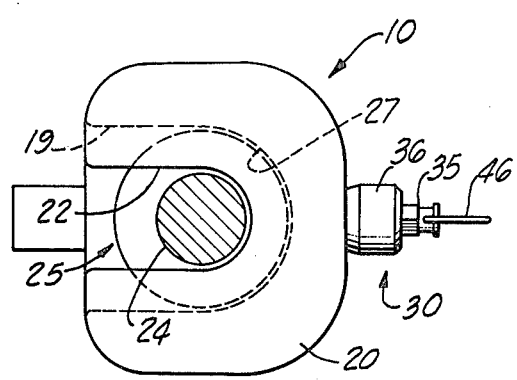
FIG. 1.
FIG. 4.
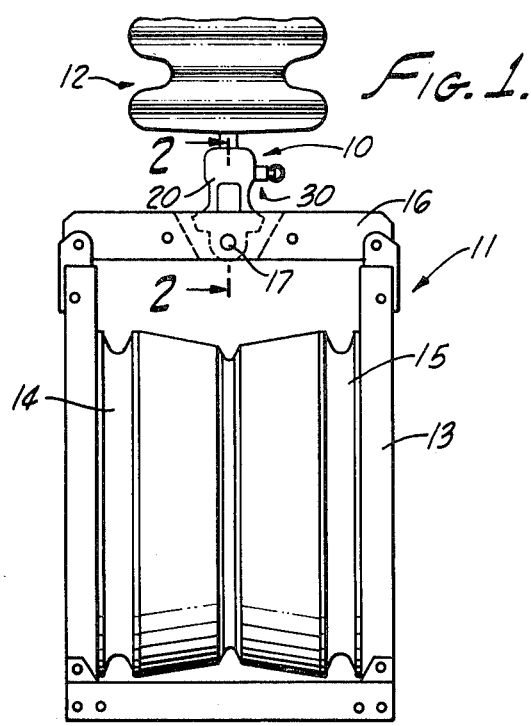
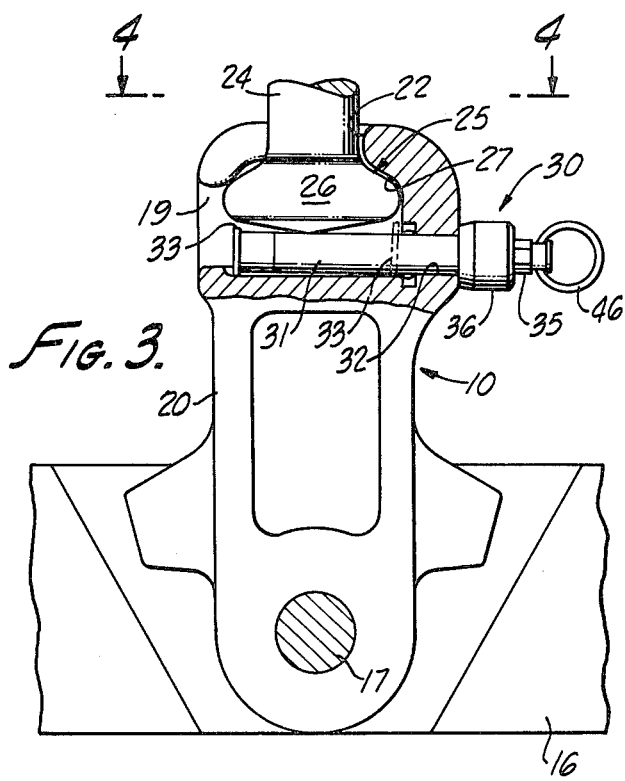
FIG. 3.
FIG. 2.
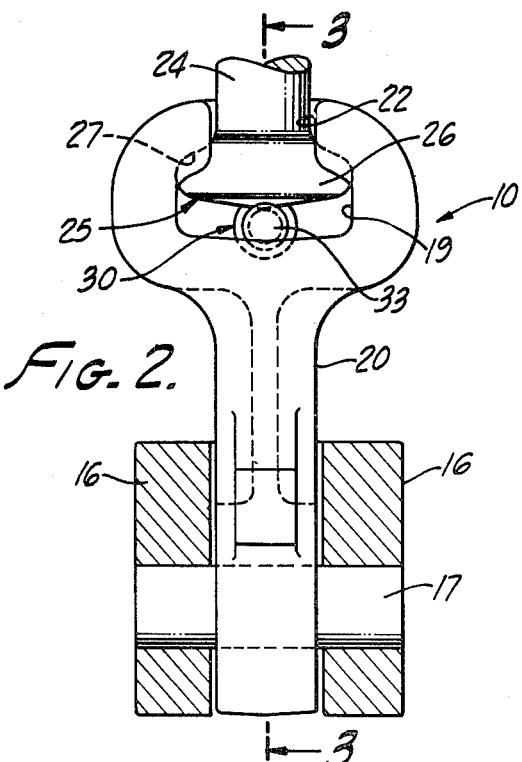
FIG. 5.
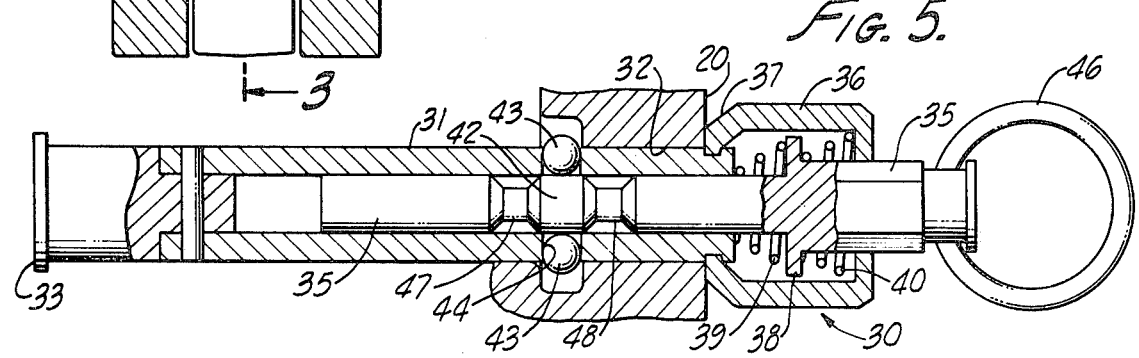

FAST ACTION DISCONNECT FOR USE ON A DOG NUT OF A POWER LINE INSULATOR AND THE LIKE

This invention relates to mechanical couplings and more particularly to a unique fast action disconnect having numerous applications and particularly suitable for releasably coupling a power line stringing block to an insulator dog nut from a remote operating position.

The invention fast action disconnect has innumerable applications for releasably interconnecting parts one of which includes a ball as, for example, trailer and vehicle hitches, cable lines, and draft assemblies of a wide variety, but is herein illustrated in use to releasably connect a power line stringing block to the dog nut at the lower end of a power line insulator. Such a nut comprises a flattened bulbous enlargement at the end of a suspension shank attached to the insulator. When the power conductors are in the process of being installed, the dog nut is employed to suspend a stringing block for the power conductors from a bracket attached to the dog nut. Before the conductors can be clamped to clamping hardware attachable to the dog nut, it is first necessary to pull the power conductors into position along the line and in proximity to the lower end of the insulator. This operation is carried out as is well known to those skilled in this art by use of a stringing block.

As herein disclosed and according to this invention any suitable stringing block is suspended from the dog nut utilizing the invention fast action disconnect. Such a disconnect comprises an elongated high strength main body having a T-shaped passage at one end sized and shaped to seat about the dog nut. Positive assurance for holding this main body assembled to the dog nut is provided by a barrier device loosely assembled to the disconnect and reciprocal between a retracted and an extended position in the former of which positions it positively locks the disconnect to the dog nut. Simple, push-pull means manually operable to form a remote operating position is effective to lock the barrier device selectively in either its retracted or its extended position. A very light force applied in the direction in which it is desired to reciprocate the barrier suffices to move it in a desired direction. The two positions of the barrier are readily observed from the remote operating station and enables the operator to visually ascertain at a glance whether the barrier is retracted or extended.

Accordingly, it is a primary object of this invention to provide a fast action disconnect for positively locking the disconnect components together or releasing them for disassembly.

Another object of the invention is the provision of a fast-action disconnector for use in holding a stringing block positively and safely coupled to an insulator dog nut and including locking barrier means operable by a tool from a remote operating position.

Another object of the invention is the provision of a ball and socket fast action disconnect incorporating reciprocal barrier means held captively assembled and readily movable between locked and unlocked positions by a tool manipulated from a remote position.

These and other more specific objects will appear upon reading the following specification and claims and upon considering in connection therewith the attached drawing to which they relate.

Referring now to the drawing in which a preferred embodiment of the invention is illustrated:

FIG. 1 is a front elevational view showing an illustrative embodiment of the invention in use to support a stringing block from the dog nut of a power line insulator;

FIG. 2 is a partial sectional view on an enlarged scale taken along line 2—2 on FIG. 1;

FIG. 3 is a partial cross-sectional view taken along line 3—3 on FIG. 2;

FIG. 4 is a cross-sectional view taken along line 4—4 on FIG. 3; and

FIG. 5 is a cross-sectional view taken on an enlarged scale through the barrier means per se while in the retracted position thereof.

Referring initially more particularly to FIG. 1, the invention fast action disconnect, designated generally 10, is shown in use to suspend a conventional multi-conductor power line stringing block 11 from the lower end of a power line insulator 12. Stringing block 11 is of any conventional construction having a main frame 13 rotatably supporting a plurality of grooves sheaves 14,15 on a shaft having its ends journalled in frame 13. The cross member 16 interconnecting the side frames is known as a suspension yoke and includes a removable pivot pin 17 crosswise of its midsection.

Referring now to FIGS. 2-4 it will be understood that disconnect 10 has an elongated main body formed from high strength material. Its upper end is enlarged and provided with an inverted T-shaped passage. One end 19 of its T-head portion opens laterally through the side of main body 20 and the upper end of its T-stem portion 22 opens upwardly axially of the main body and loosely accommodates the shank 24 of the dog nut 25. This dog nut has a flattened bulbous head 26 having a loose fit in a complementally shaped socket 27 at the junction of the T-head and the T-stem portion of passages 19 and 22.

Means for releasably locking the dog nut assembled to socket 27 comprises a reciprocal barrier assembly, designated generally 30, best shown in FIGS. 3 and 5. This barrier has a tubular housing 31 having a loose sliding fit within a bore 32 through the otherwise closed end of the T-head passage 19. As shown in all figures of the drawing, the barrier is in its fully retracted position but when it is in its fully extended position the annular flange 33 at its left hand end abuts the interior end wall of the T-head passage 19. The tubular main body 31 is so sized that, when in its retracted position, it holds the bulbous portion 26 of the dog nut positively locked within socket 27. However, when the barrier 30 is pulled outwardly to its extended position represented by the dotted line 33 in FIG. 3, it will be apparent that the bulbous portion 26 of the dog nut is freely releasable from passages 19, 22.

Suitable means for holding barrier 30 locked in either its exended or retracted position comprises a plunger 35 having a smooth sliding movement within tubular body 31. Plunger 35 is held assembled to body 31 by a retaining collar 36 crimped at 37 to main body 31. Plunger 35 is provided with a flange 38 within collar 36 spring biased to the position shown in FIG. 5 by a pair of generally similar light compression springs 39,40. When in this neutral position a land 42 in the midlength of plunger 35 is in position to hold a plurality of detents or balls 43 extended against the crimped outer ends of radial passages 44 in main body 31. When balls 43 are so positioned, it is readily apparent the barrier 30 cannot be pulled outwardly toward its extended position. However, if plunger 35 is pulled outwardly in opposition to spring 40 by applying a pull to a manipulating ring 46 at the outer end of the plunger, groove 47 in the plunger will be brought radially opposite balls 43 whereupon the balls will be cammed into groove 47 thereby permitting the plunger to be pulled outwardly to its fully extended positon represented by the dotted line 33 in FIG. 3. As soon as the barrier has been moved to this extended position and as the pull in ring 46 is released, spring 40 will shift plunger 35 back to its neutral position and the inclined sidewalls of groove 47 will cam balls 43 outwardly until resting against land 42 of the plunger. So long as the balls remain in this position they will engage the outer end of the bore 32 in the main body 18 of the disconnect and it will be impossible to shift the barrier 30 back to its retracted position until and unless axial pushing pressure is applied to the outer end of the plunger. If such pressure is applied then groove 48 of the plunger will underlie ball 43 and the latter will then be cammed into this groove permitting the barrier to be moved back to its fully retracted position. As soon as the pushing pressure is relieved from the outer end of plunger 35, spring 39 will return the plunger to its locking position wherein balls 43 rest against land 42. Under these conditions it will be impossible to reciprocate the barrier back to its extended position until a pulling force is applied to ring 46 of the plunger.

The mode of use and operation of the invention disconnect 10 will be readily apparent from the foregoing detailed description. To assemble the disconnect 10 to a dog nut the workman merely applies a pull to ring 46 of the barrier assembly and pulls it to its extended position utilizing the small amount of energy required to compress the light compression spring 40. Once the barrier is fully extended it is locked in this position as described above and it is a simple matter to insert the dog nut through the T-shaped passage 19,22 of the insulator. Thereafter, the workman can employ a long handled tool provided with a hook engageable with ring 46 to apply a light push axially of plunger 35 to return the barrier to its retracted position. It is automatically locked in this position as the pushing force is released and spring 39 restores land 42 of the plunger radially opposite balls 43 to hold these balls in an extended position shown in FIG. 5. It is then impossible to disengage the dog nut from disconnect 10 until and unless the workman applies a pulling force to the outer end of plunger 35.

While the particular fast action disconnect for use on a dog nut of a power line insulator and the like herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. A fast action disconnect for use in detachably connecting equipment to the dog nut of a power line insulator comprising:
   a rigid body member having means for connecting the same to equipment at a first end thereof;
   the opposite end of said body member having a T-shaped passage opening through one lateral side and the adjacent end of said main body and having a socket at the junction of the T-stem and T-head thereof for receiving and seating a dog nut at the lower end of a power line insulator;
   barrier means supported in a portion of said T-head for movement between a retracted position effective to lock a dog nut positively assembled within said passage and an extended position permitting free movement of a dog nut into and out of assembly into said passage; and
   said barrier means including manually-controlled spring biased means cooperating with said main body effective to lock said barrier means in said extended position.

2. A fast action disconnect as defined in claim 1 characterized in that said barrier means includes means effective to lock the same selectively in the retracted position and in said extended position at the user's option.

3. A fast action disconnect as defined in claim 2 characterized in that said lock means includes detent means movably supported in generally radial passage means in said barrier means which detent means is actuatable by said manually-controlled spring biased means.

4. A fast action disconnect for connecting equipment to a dog nut or the like comprising:
   a main body provided with a generally T-shaped passage the T-head portion of which opens through one lateral side of said main body and the T-stem portion of which opens through one end of said main body, said T-shaped passage being sized and shaped to loosely seat a dog nut;
   barrier means captively supported in said passage and movable between a retracted position effective to lock a dog nut positively assembled to said main body and movable to an extended position wherein a dog nut is freely movable into and out of said passage; and
   said barrier means including spring-biased ball detent means for locking said barrier means in said retracted positon to lock said disconnect coupled to a dog nut and including manually operable means for unlocking said barrier means for movement to the extended position thereof to release said disconnect from a dog nut.

5. A fast action disconnect as defined in claim 4 characterized in that said manually operable means includes means adapted to be engaged by a long handled tool manipulatable to unlock said barrier means and move the same between said extended and retracted positions.

6. A fast action disconnect for connecting power line handling equipment to the dog nut at the lower end of a power line suspension insulator comprising:
   a main body having a T-shaped passage sized and shaped to loosely seat an insulator dog nut therein and including a T-head portion opening through one side of said main body and a T-stem portion opening through one end of said main body,
   manually manipulatable barrier means movable along said T-shaped passage between a retracted positive effective to lock said disconnect positively assembled to an insulator dog nut and an extended position wherein a dog nut is freely movable into and out of said passage; and
   said barrier means including spring-biased manually-releasable ball detent means normally effective to lock said barrier means in the retracted position thereof.

7. A disconnect as defined in claim 6 characterized in that said barrier means includes means for holding the same permanently assembled to said main body, and means on said barrier means for holding the same selectively in the extended position and in the retracted position thereof.

8. A disconnect as defined in claim 7 characterized in that said barrier means includes manually operable means readily manipulated from a position remote from said disconnect to release said holding means and permit said barrier means to be moved to the alternate position thereof.

* * * * *

UNITED STATES PATENT AND TRADEMARK OFFICE
CERTIFICATE OF CORRECTION

PATENT NO. : 4,160,540
DATED : July 10, 1979
INVENTOR(S) : Keith E. Lindsey and Hoyt W. Bozeman Jr.

It is certified that error appears in the above-identified patent and that said Letters Patent are hereby corrected as shown below:

Claim 6, Col. 4, line 57, after "means" insert --captively assembled to said main body and --.

Claim 8, Col. 5, line 5, "7" should be --6--.

Signed and Sealed this

Ninth Day of October 1979

[SEAL]

Attest:

RUTH C. MASON
Attesting Officer

LUTRELLE F. PARKER
Acting Commissioner of Patents and Trademarks